Inventors:
Harold Kenneth Moneypenny
Ronald Kitchener

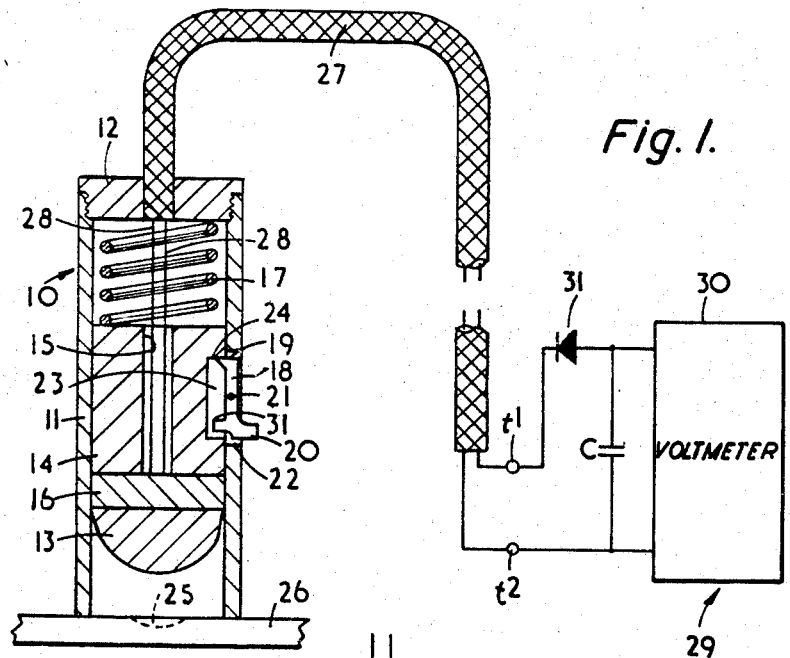
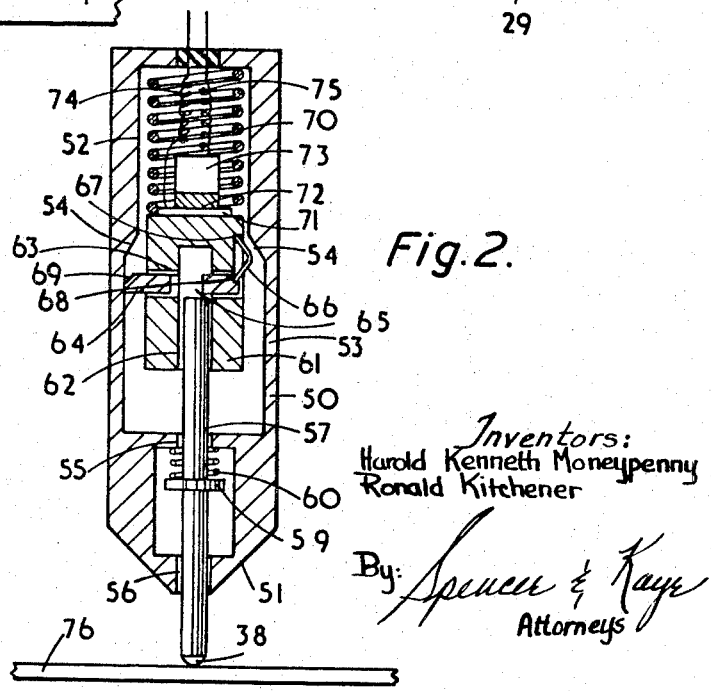

United States Patent Office 3,421,364
Patented Jan. 14, 1969

3,421,364
METHODS OF AND APPARATUS FOR MEASURING THE HARDNESS OF MATERIALS
Harold Kenneth Moneypenny, Wolverhampton, and Ronald Kitchener, Penn, Wolverhampton, England, assignors to G.K.N. Group Services Limited, Smethwick, England, a British company
Filed Aug. 4, 1965, Ser. No. 477,187
U.S. Cl. 73—82                                  9 Claims
Int. Cl. G01n 3/42

ABSTRACT OF THE DISCLOSURE

A method of and apparatus for testing the hardness of materials in which an indenter penetrates the material to cause permanent deformation thereof. The indenter is given a predetermined quantum of kinetic energy either by being accelerated to a given velocity or by being struck by a known mass accelerated to a given velocity. A piezoelectric element is so associated with the indenter tip that it is stressed during deceleration of the tip as it penetrates the material so that the output from the piezoelectric element is proportional to such deceleration and is measured to give a reading representative of the hardness of the material.

---

Figure 3:
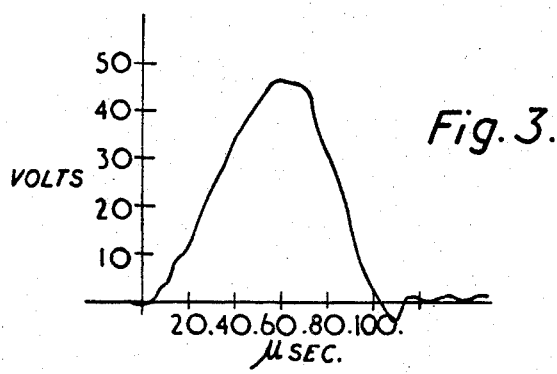

This invention relates to methods of, and apparatus for, measurement of hardness of materials.

Conventional methods of measurement and apparatus for use in the performance thereof involve the pressing of an indenter tip into the surface of the material in question, for this purpose a predetermined force being exerted on the tip in a direction towards the surface of the material so that the depth of penetration of the tip is dependant upon the hardness, as are the cross-sectional dimensions of the indentation produced. In conventional methods of hardness testing it is usually one of these quantities that is measured to determine hardness.

Conventional forms of indenter tip are either part-spherical or taper symmetrically to a point.

In the case of the known Brinell test a part-spherical indenter tip is employed and the Brinell hardness number is the quotient of the load applied divided by the surface area of the indentation. The hardness number is determined by measuring the diameter of the impression and reading off the hardness number from a table corelating the hardness numbers with diameters of impressions.

In the Vickers test the indenter tip is a square-based pyramid having an apex angle between opposite sides of 136°, and the hardness number is again the quotient of the load applied divided by the surface area of the indentation. In this case also a dimension of the indentation, namely the diagonal dimension, is measured and the Vickers hardness number read off from a table corelating diagonal dimensions with hardness numbers.

In the known Rockwell test the indenter tip is either part-spherical or of conical form and the Rockwell hardness number is the actual depth of the impression, there being thus two series of Rockwell hardness numbers according to the shape of the indenter tip used.

These methods and forms of apparatus cannot in many instances be conveniently used for measuring the hardness of materials which have already been incorporated in manufactured component parts, or parts already incorporated in an assembly thereof. It is necessary for example, that the material under examination shall be properly supported against the considerable force which is exerted to cause the indenter tip to penetrate into the material. This force is normally of the order of 10 to 300 lbs. weight (5–150 kg. weight) when measuring the Vickers hardness number, and of the order of 3,000 lbs. weight (1,500 kg. weight) when measuring the Brinell hardness number. The application of such forces would require the provision of specially designed mounting or supporting members for cooperation with the component under examination.

Furthermore the operation of measuring the hardness by these methods and these forms of apparatus is unsuitable for use as a nondestructive measurement in mass or quantity production of components, partly because of the space occupied, and to some extent because of the size of the indentation which may be significant and unacceptable in relation to certain small components.

Nevertheless measurement of hardness is a most desirable measurement to carry out in respect of many manufactured components as a nondestructive test since hardness is related to other important mechanical properties such as ultimaate tensile strength.

The object of the present invention is to provide a method of hardness measurement and apparatus therefor which can, in the case of the method, be rapidly and conveniently performed and does not require special or complex jigs or supporting structures for the component under examination, and which in the case of the apparatus can be constructed in the form of a compact head or probe capable of being held manually against a component under examination.

From one aspect the present invention resides in a method of measuring the hardness of a material comprising the steps of bringing an indenter tip and the surface of the material into contact with each other, supplying to the tip a predetermined quantum of kinetic energy to cause the tip to penetrate the material, the resistance of which to indentation brings the tip to rest, and generating a hardness signal representative of the resultant arresting force acting on the indenter tip in the course of its being brought to rest.

This method is based on an analysis starting with Meyer's law which is stated as:

$$f = kr^n$$

where:

$f$ is the force producing dynamic indentation of a material,
$k$ is a constant,
$r$ is the radius of the indentation at the surface of the material, and
$n$ is Meyer's index (constant for a given material).

If the value of $n$ is taken as approximating to 2 (in practice it is 2.04 for work hardened steel) then the peak force $f_{max}$ exerted on the indenter tip to bring this to rest is related to the stress at the plastic yield point of the material (that is to say, the force applied to the material by the indenter tip divided by the plan or projected area of the impression formed in the material and designated by Y) by the relation:

$$f_{max} \alpha Y^{1/2}$$

(for a part-spherical indenter tip), whereas the depth of penetration $x_{max}$ is similarly related by the relation:

$$x_{max} \: \alpha \overline{Y}^{1/2}$$

A similar relation is found to exist where the indenter tip is of pyramidal form, in this case however:

$$f_{max} \: \alpha Y^{1/3}$$

and $$x_{max} \: \alpha \overline{Y}^{1/3}$$

The quantity Y is closely related to the conventional hardness numbers.

In the case of conventional methods of measurement using a part-spherical indenter tip, the quantity Y is a close approximation to the hardness number when calculated, as in the case of the Brinell test, as the quotient of the load applied divided by the surface area of the indentation, provided that the indentation is a small proportion of the sphere.

In conventional measurements where the indenter tip tapers symmetrically to a point, for example, in the case of the Vickers test where the indenter tip is a square-based pyramid, the quantity Y is proportional to the Vickers hardness number calculated as the quotient of the load applied divided by the surface area of the pyramidal indentation since this surface area is itself proportional to the plan or projected area of the indentation.

The relationship between the quantity Y and the Rockwell hardness numbers will be apparent from the relationships set forth above corelating $x_{max}$ and Y.

In the conventional methods of measuring hardness, namely determination of the Brinell, Vickers and Rockwell hardness numbers, a quantity which is related to $x_{max}$ is measured, namely the diameter of the impression in the Brinell test, the diagonal dimension impression in the Vickers test, and the actual depth of the impression in the Rockwell test. The invention is further based on the concept that the quantity $f_{max}$ (peak arresting force) can be more conveniently measured than the dimensions of the impression which have hitherto been measured in the conventional forms of test.

In a preferred manner of carrying out the method of the invention the hardness signal is generated by subjecting a stress sensitive electrical element associated with the indenter tip to the arresting force or a predetermined proportion thereof, and the peak value of the hardness signal or a quantity related thereto is measured.

It will be understood that the arresting force exerted on the tip is necessarily equivalent to the deceleration of the tip so that any measurement of the deceleration may be deemed a measurement of the arresting force and vice versa, and the term "arresting force" is to be so interpreted in the claims appended hereto.

From a further aspect the invention resides in the provision of an apparatus for measuring the hardness of a material comprising an indenter tip, an energy source for supplying a predetermined quantum of kinetic energy to the tip for moving the tip to penetrate the material under examination the resistance of which to such penetration brings the tip to rest, and an element operatively associated with the tip in a manner such as to generate a hardness signal representative of the arresting force exerted on the tip by the material.

In one form of the apparatus a stress responsive electrical element is interposed operatively between a mass, to which a predetermined velocity is imparted by said energy source, and the tip so that said element is subjected to at least a proportion of the arresting force exerted upon the tip by the material undergoing indentation.

Further, it is preferred that the mass which forms the source of kinetic energy and the velocity with which this mass is moved preparatory to penetration of the material under examination by the indenter tip shall be so related to each other that the component of stress to which the stress responsive electrical element is subjected in the course of arrestation of the indenter tip, due to the kinetic energy of the mass, is large in comparison with any component of stress (whether positive or negative) to which it is subjected as a result of the dead weight of this mass.

This enables the apparatus to be used without material variation in the accuracy in any orientation.

The stress responsive electrical element may be connected electrically to a measuring device for measuring the peak value of the hardness signal produced. The measuring device may include means for storing electrical signals pertaining to each of a plurality of successive indentations of material by the indenter tip, and means for determining the average value of these stored signals.

Figure 4:
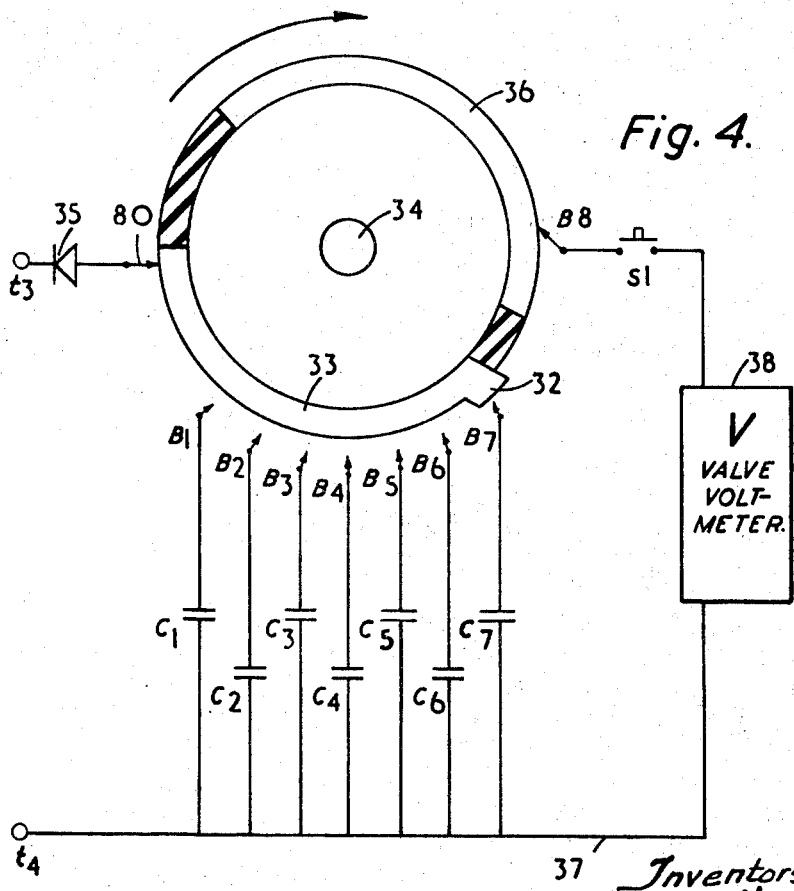

The invention will now be described by way of example with reference to the accompanying drawings wherein:

FIGURE 1 shows one form of apparatus in accordance with the invention partly in vertical cross-section through the head or probe, FIGURE 2 shows a vertical cross-section through an alternative form of head or probe, FIGURE 3 shows the form of a typical output pulse from the head or probe, and FIGURE 4 shows a modified arrangement of the measuring circuit in the apparatus.

As shown in FIGURE 1 the apparatus comprises a head or probe 10 which may be made of comparatively small size so that it can conveniently be applied to material 26 to be tested even when such material is incorporated in manufactured components, either after assembly in a machine or apparatus, or preparatory to assembly.

The head or probe 10 comprises a tubular body 11, the interior face of which constitutes a guideway and which is open at one end and closed at the other by a cap or plug member 12.

In the body 10 is disposed a sliding unit comprising an indenter tip 13 which is shown as being of part-spherical form and is made from hardened steel or other suitable hard material capable of indenting any of the various kinds of material, the hardness of which is required to be measured.

The unit further comprises a mass 14 which is of generally cylindrical shape and is formed with an axially extending bore 15. Between the mass 14 and the indenter tip 13 is disposed a stress responsive electrical element such as a piezoelectric crystal 16 which may, if desired, be secured to the mass 14 and to the tip 13 along its faces which are in contact with these parts, for example, by a suitable adhesive substance.

The unit comprising the parts 13, 14, 16 is slidable in the guideway afforded by the body 11 and is urged towards the open end of this body by means of an energy source in the form of a coiled compression spring 17 disposed between the plug or cap 12 and the mass 14.

The spring may be stressed compressively by pressing the unit 13, 14, 16 into the body, in which position it is retained by latch means comprising a latch lever 18 having a pawl shaped tip 19 disposed internally of the body, and a finger piece 20 disposed externally of the body. The latch lever 18 is pivoted intermediate its ends by a pin 21 and is disposed mainly in a slot 22 formed through the side wall of the body.

The mass 14 is formed with a longitudinally extending groove 23 at one end of which is presented a shoulder 24 with which the pawl tip 19 cooperates to retain the movable unit in its loaded or retracted position.

Depression of the finger piece 20 towards the body will move the pawl tip outwardly and allow the unit 13, 14, 16 to travel towards the open end of the body 11 under the influence of the spring 17 to produce indentation, as indicated by dotted line 25, of the material 26, the hardness whereof is to be measured.

The latch lever 18 includes a lug 31 disposed in the groove 23 in order to prevent expulsion of the movable unit 13, 14, 16 if the body should be out of contact with the surface of the material under test when the finger piece 20 is depressed.

Because of the contact between the body 11 at its open end and the surface of the material 26 the unit 13, 14, 16 undergoes a predetermined travel within the body upon release of the pawl tip 19, and, therefore, attains a predetermined velocity so that the kinetic energy stored in the mass 14 is constant for each operation of the device.

The value of the kinetic energy should be sufficiently high to ensure that the peak force required to be exerted by the material in arresting movement of the unit is high relatively to the dead weight of the unit itself. The apparatus can then be used in any orientation without inaccuracy arising. A typical value of the kinetic energy is of the order of $10^6$ dyne-cm. (0.1 joule).

This mass is substantially greater than the mass of either the tip 13 or the piezoelectric crystal 16, so that the stress to which the latter is subjected during arrest of the indenter tip 13 arises substantially wholly because of the kinetic energy stored in the mass 14.

The peak value of this stress is measured by means of the signal produced by the piezoelectric crystal 16 which is connected by a flexible cable 27, the conductor cores 28 of which extend from opposite faces of the crystal and through the bore 15 of the mass 14 to a measuring device indicated generally at 29, FIGURE 1.

This comprises a valve voltmeter 30 and a storage condenser C connected in parallel across input terminals $t1$ and $t2$. The signal is preferably fed to the storage condenser C through means preventing discharge of the condenser, for example, a rectifier 31 as shown. This enables the voltmeter to display a steady, or approximately steady voltage.

The piezoelectric crystal is itself a capacitor and consequently the curent produced as a result of generation of a voltage pulse is shared between the capacitor represented by the piezoelectric crystal itself and the condenser C of the valve voltmeter. The capacity of condenser C is so chosen relative to that of the crystal that the voltage across condenser C is of the correct order for accurate measurement by the valve voltmeter. The maximum voltage to which the condenser C is charged is thus related to the peak voltage achieved during the voltage pulse and the reading of the voltmeter is, therefore, related to and derived directly from the peak value of arresting force.

The scale of the voltmeter 30 may be calibrated directly in terms of conventional hardness numbers, such, for example, as Brinell or Vickers hardness numbers.

The voltmeter may include a switch for discharging the condenser after each operation of the head or probe 10 or after any desired number of operations.

A modified form of head or probe is shown in FIGURE 2. This probe comprises a generally cylindrical body 50 formed with a tapering nose portion 51. The body is generally hollow and is provided with upper and lower chambers 52, 53, the upper of which is of reduced internal diameter as compared with the lower one and the two chambers being connected by a downwardly divergent frusto-conical surface portion 54, the purpose of which will be described hereafter. The terms "upper" and "lower" are herein intended to refer respectively to the ends of the body remote from, and adjacent to, the nose portion 51.

At the lower end of the body 50 there are two axially spaced central guide surfaces 55, 56 formed in respective flanges which serve to locate and guide a shaft 57 which projects from the lower end of the probe and carries a part-spherical indenter tip 38 at its lower end. The shaft 57 is formed, or provided with a collar 59 integral therewith, or fixed thereto, and disposed between the flanges presenting the giude surfaces 55 and 56. A light spring 60 acts between the upper side of the collar 59 and the lower side of the flange in which the upper guide surface 55 is provided. The shaft 57 is retained within the body by abutment between the collar 59 and the flange in which the lower guide surface 56 is formed.

The upper end of the shaft 57 is disposed within a blind bore 62 formed axially in a cylindrical block 61 from the lower end thereof. This cylindrical block is disposed partially within the upper chamber 52 and has an external diameter slightly less than the internal diameter of this chamber so as to be an easy sliding fit therein. A diametral slot 63 is formed in the block 61 to intercept the blind bore 62 near its upper or closed end. This slot 63 houses a trigger 64 formed as a close sliding fit therein.

The trigger 64 is formed in its mid-region with a transverse bore 65 of diameter equal to that of the blind bore 62 in the block 61 and capable of being aligned with the bore 62 so as to allow free relative movement between the block 61 and the shaft 57. The trigger 64 is normally biased by a leaf-spring 66 into a position in which the bores 62 and 65 are out of alignment, as illustrated, so that the shaft 57 is not permitted to move fully into the bore 62 due to abutment between the upper end face of the shaft and the trigger.

The leaf-spring 66 is located at one end within a recess 67 formed in the outer surface of the block and at the other end within a recess 68 formed in one end of the trigger 63 and is constrained into arcuate form as shown. Lateral expulsion of the spring 66 is prevented by abutment between the spring and the inner surface of the body 50. At its other end the trigger 64 is formed with a cam surface 69 adapted to engage the frusto-conical surface portion 54 of the body, which serves as a trigger operating cam surface and is hereinafter referred to as the trigger operating surface 54.

The block 61 is urged downwardly by a strong spring 70 which acts between the upper surface of the block and the upper end of the body. Resting on the upper surface of the block 61 within the turns of the spring 70 is a conductive disc 71 supporting a piezoelectric crystal 72 on which rests a mass 73 of conductive material. The block 61, disc 71, crystal 72 and mass 73 may be joined together, for example by means of an adhesive. The mass 73 stresses the crystal 72 by virtue of its momentum when the indenter tip 58 penetrates a material under test and is thereby brought to rest. The voltage generated by the crystal is led to the measuring circuit by means of extensible conductors 74 and 75 which are connected respectively to the disc 71 and the mass 73.

The operation of the device is as follows. When it is desired to determine the hardness of a sample the probe is advanced towards the latter so that the tip 38 contacts the surface 76 to be tested. Further downward movement of the body 50 towards the surface 76 results in the compression of the spring 70 by relative upward movement of the block 61 due to the abutment of the upper end of the shaft 57 (which is held stationary by virtue of the contact of the tip 58 with the surface 76) and the trigger 64, until the trigger operating surface 54 contacts the cam surface 69 on the trigger and so displaces the latter against the action of the leaf-spring 66 until the bores 65 and 62 are in alignment, whereupon the block 61 is moved downwardly under the influence of spring 70 so that the inner end of the blind bore 61 strikes the upper end of the shaft 57 to deliver a predetermined blow to the indenter tip 38. Deceleration of the moving unit, comprising mass 73, crystal 72, disc 71, block 61, shaft 57 due to the resistance to the penetration of the tip causes the crystal to be stressed in the manner referred to previously, and the electrical signal generated thereby is measured by means of a measuring circuit which may be as illustrated in FIGURE 1.

When the probe is subsequently removed from the surface 76 the light spring 60 resets the probe by urging it outwardly and the leaf-spring 66 resets the trigger so that the probe is ready for further use. Thus this form of probe is automatically triggered and reset by application to and removal from the surface to be tested.

Although the foregoing description is in relation to the testing of a horizontal surface it will be appreciated that this head or probe, as in the case of the first embodiment, is capable of being used in any attitude since the dead weight of mass 73 is small in comparison with the force exerted on the crystal thereby during its deceleration.

The mass 73 in relation to the overall mass of the moving unit is chosen to give a satisfactory output from the crystal, since depending on the characteristics of the crystal it is not always necessary to subject to the crystal to the full load as in the first embodiment described. A typical output pulse from the head is shown in FIGURE 3 from which it will be seen that the peak voltage generated is of the order of 50 volts and the duration of the pulse is of the order of 0.1 millisecond.

If desired a more complex measuring circuit can be employed in which a plurality of condensers or other subcircuits, each capable of storing an electrical signal, are provided, switch means for connecting the head or probe 10 successively to these condensers or subcircuits being provided so that signals pertaining to successive operations of the head or probe are stored respectively therein. A circuit providing these facilities is illustrated in FIGURE 4.

It will be understood that the terminals t3 and t4 of this circuit are connected to the conductors of the cable 27 and that the head or probe is as previously described with reference to either of FIGURES 1 and 2.

The circuit illustrated in FIGURE 4 comprises a plurality of subcircuits which are successively connected between the terminals t3 and t4, the subcircuits including condensers C1 to C7 and associated brushes B1 to B7, which latter cooperate with a contact projection 32 on an electrically conductive segment 33 rotatable about an axis 34 to bring the contact projection successively into engagement with the brushes.

Each of the individual subcircuits, such as B1, C1, is thus fed with a pulse of current through a rectifier 35 and the condenser concerned becomes charged to a voltage which is related to the hardness of the material under test in the manner already described.

Upon completion of a series of tests, as a result of which all or some of the condensers C1 to C7 have become charged, the subcircuits containing these condensers are connected in parallel with each other by rotating the segment 33 to a position in which the contact projection is removed from all of the brushes B1 to B7 and a further electrically conductive segment 36 is brought into contact with all the brushes B1 to B7 simultaneously.

The voltage then existing between the segment 36 and the base line conductor 37 connected to terminal t4 is then the average of the individual voltages previously appearing at brushes B1 to B7 and such average voltage is applied to a measuring device, such as a valve voltmeter 38, through the intermediary of a normally open pressbutton switch S1.

Although the preferred form of stress responsive element is an electrical element, namely one producing an electrical signal in response to the application of stress, it is contemplated that it would be within the scope of the invention to measure the peak value of the arresting force in some other way. For example, it would be possible to utilise as the stress responsive element a compressible capsule containing a liquid which would be expelled from the capsule along a duct to displace a peak measuring indicator element against spring or other biasing means so as to indicate the peak value of the arresting force.

It is to be understood that the term "measuring" as used herein is not limited to meaning determining a numerical value, but includes comparing a value with a reference value to establish whether this value is exceeded or not.

We claim:
including:
  (a) indenter means for penetrating said material,
  (b) driving means for supplying a predetermined quantum of kinetic energy to said indenter means to cause the latter to penetrate said material by virtue of such kinetic energy whereby said material is subjected to plastic deformation and said indenter means is subjected to an arresting force, the improvement comprising
  (c) generator means including a transducer responsive to said arresting force to generate an electrical signal representative of the hardness of said material, said transducer being stationary with respect to said indenter means during the period in which said arresting force is measured, and
  (d) measuring means for measuring said signal.

2. In apparatus for measuring the hardness of material including:
  (a) indenter means for penetrating said material,
  (b) driving means, comprising an energy source and a mass to which a predetermined velocity is imparted by said energy source, for supplying a predetermined quantum of kinetic energy to said indenter means to cause the latter to penetrate said material by virtue of such kinetic energy, whereby said material is subjected to plastic deformation and said indenter means is subjected to an arresting force, the improvement comprising
  (c) generator means comprising a stress responsive electrical element operatively interposed between said mass and said indenter means, said generator means being responsive to said arresting force to generate a hardness signal representative of the hardness of said material, and
  (d) measuring means for measuring said signal.

3. Apparatus as claimed in claim 2 further comprising a probe body having guide means for said mass, wherein said energy source comprises spring means for urging said mass in one direction and said driving means further comprises releasable latching means for holding said spring means in stressed condition preparatory to movement of said mass, the indenter means being movable with said mass under constraint of said guide means to penetrate said material and be subjected to deceleration due to the resistance to penetration of said material.

4. Apparatus as claimed in claim 3 wherein said mass, said stress responsive means and said indenter means are formed as a unit which is movable as a whole and said unit has a dead weight which is small in comparison with said predetermined quantum of kinetic energy.

5. Apparatus as claimed in claim 3 wherein said mass is movable relatively to said body and to said indenter means by said spring means to deliver said predetermined quantum of kinetic energy to said indenter means by impact with the latter to cause said penetration, stressing means being provided for subjecting said stress responsive means to a stress proportional to said deceleration of said indenter means.

6. Apparatus as claimed in claim 5 wherein said stressing means comprises a block carried by said stress responsive means and said block, said stress responsive means, and said mass are formed as a unit which is movable as a whole under the influence of said spring means.

7. In a method of measuring the hardness of a material, by plastic deformation of the latter due to penetration of the latter by indenter means which is thereby subjected to an arresting force due to the resistance to penetration of said material including the steps of:
  (a) bringing said indenter means into contact with said material,
  (b) supplying said indenter means with a predetermined quantum of kinetic energy to cause the latter to penetrate said material, the improvement comprising
  (c) generating an electrical signal representative of said arresting force only during the period in which said arresting force is acting, said signal being an index of hardness.

8. A method as claimed in claim 9 further comprising the step of measuring the peak value of said signal.

9. A method as claimed in claim 8 wherein said step of supplying said indenter means with said predetermined quantum of kinetic energy is carried out prior to said step of bringing said indenter means into contact with said material.

References Cited

UNITED STATES PATENTS

| | | | |
|---|---|---|---|
| 1,393,989 | 10/1921 | Zubler | 73—82 |
| 1,581,839 | 4/1926 | Dahlqvist | 73—82 |
| 2,323,925 | 7/1943 | Markwardt | 73—81 |
| 2,834,202 | 5/1958 | Cook | 73—81 |
| 2,834,203 | 5/1958 | Sampson | 73—81 |
| 3,298,222 | 1/1967 | Costello et al. | 73—12 |

RICHARD C. QUEISSER, *Primary Examiner.*

C. I. McCLELLAND, *Assistant Examiner.*

UNITED STATES PATENT OFFICE
CERTIFICATE OF CORRECTION

Patent No. 3,421,364　　　　　　　　　　January 14, 1969

Harold Kenneth Moneypenny et al.

It is certified that error appears in the above identified patent and that said Letters Patent are hereby corrected as shown below:

Column 7, after line 63, insert -- 1. In apparatus for measuring the hardness of material --; line 75, "to aid" should read -- to said --.

Signed and sealed this 24th day of February 1970.

(SEAL)
Attest:

Edward M. Fletcher, Jr.　　　　　　　　WILLIAM E. SCHUYLER, JR.
Attesting Officer　　　　　　　　　　　Commissioner of Patents